(12) United States Patent  (10) Patent No.: US 6,724,616 B2
Kuo et al.  (45) Date of Patent: Apr. 20, 2004

(54) ELECTRONIC DEVICE BATTERY PACK REMOVAL AND EMPLACEMENT LOCK STRUCTURE

(75) Inventors: Andy Kuo, Taipei (TW); Cheng-Hsiung Yen, Luchou (TW)

(73) Assignee: Inventec Corporation, Taipei (TW)

( * ) Notice: Subject to any disclaimer, the term of this patent is extended or adjusted under 35 U.S.C. 154(b) by 52 days.

(21) Appl. No.: 10/214,173

(22) Filed: Aug. 8, 2002

(65) Prior Publication Data

US 2004/0027794 A1 Feb. 12, 2004

(51) Int. Cl.[7] .................................................. G06F 1/16
(52) U.S. Cl. ..................... 361/683; 361/679; 364/708.1; 312/223.2; 710/304
(58) Field of Search ................................ 361/679–683, 361/724–727; 364/708.1; 312/223.1–223.6; 429/96–100; 710/300–304

(56) References Cited

U.S. PATENT DOCUMENTS 5,768,098 A  *  6/1998  Murayama .................. 361/684
6,560,100 B1  *  5/2003  Shin et al. .................. 361/686
6,608,399 B2  *  8/2003  McConnell et al. ........ 307/10.1

\* cited by examiner

Primary Examiner—Hung Van Duong
(74) Attorney, Agent, or Firm—Bacon & Thomas, PLLC

(57) ABSTRACT

The invention is to provide an electronic device battery pack removal and emplacement lock structure consisting of a compartment recessed in the case of an electronic device for the installing a battery pack, a minimum of one hook block proximal to its end at one side between the said battery pack and the said compartment, a minimum of one tapered polyhedron proximal to its other end, and a release structure internally disposed in the said compartment. As such, when the said battery pack is placed into the said compartment, the said tapered polyhedron pushes the said release structure until the said battery pack is completely ensconced within the said compartment, following which the said release structure automatically returns to its original position to restrain the said tapered polyhedron and render it immovable.

7 Claims, 6 Drawing Sheets

ELECTRONIC DEVICE BATTERY PACK REMOVAL AND EMPLACEMENT LOCK STRUCTURE

BACKGROUND OF THE INVENTION

1) Field of the Invention

The invention herein relates to battery containment mechanisms in electronic devices, specifically an electronic device battery pack removal and emplacement lock structure.

2) Description of the Prior Art

The rechargeable battery packs of conventional notebook computers, referring to FIG. 1, consists of the said battery pack 1 installed in a recessed compartment 20 of the said notebook computer 2, the said battery pack 1 having a minimum of one opening 10 disposed at an appropriate position and the said compartment 20 having an internally situated hook latch 22 such that when the said battery pack 1 is installed into the said compartment 20, the said battery pack 1 is thereby secured within the said compartment 20. To remove the said battery pack 1, the said hook latch 22 is retracted from the said opening 10 using two hands. However, when the said battery pack 1 is installed into the said compartment 20, since its surface is flush with the surface of the said notebook computer 2, the said battery pack 1 is difficult to extricate and creates numerous user inconveniences and problems.

SUMMARY OF THE INVENTION

In view of the said shortcomings, specifically that the said battery pack must be removed in an operation requiring the use of both hands and the said battery pack is difficult to extricate from the said compartment, the inventor of the invention herein conducted extensive research and experimentation that culminated in the successful development of the electronic device battery pack removal and emplacement lock structure of the invention herein which consists of a compartment recessed in the case of an electronic device that provides for the installation of a battery pack, a minimum of one hook block proximal to its end at one side between the said battery pack and the said compartment, a minimum of one tapered polyhedron proximal to its other end, and a release structure internally disposed in the said compartment As such, when the said battery pack is placed into the said compartment, the said tapered polyhedron pushes the said release structure until the said battery pack is completely ensconced within the said compartment, following which the said release structure automatically returns to its original position to restrain the said tapered polyhedron and render it immovable. When the said release structure is toggled, the said release structure pushes the said hook block, enabling the extrication of the said battery pack from the said compartment and, furthermore, its stationing at the said release position.

The above and other objects, features and advantages of the present invention will become apparent from the following detailed description taken with the accompanying drawings.

DETAILED DESCRIPTION OF THE INVENTION

Figure 1:
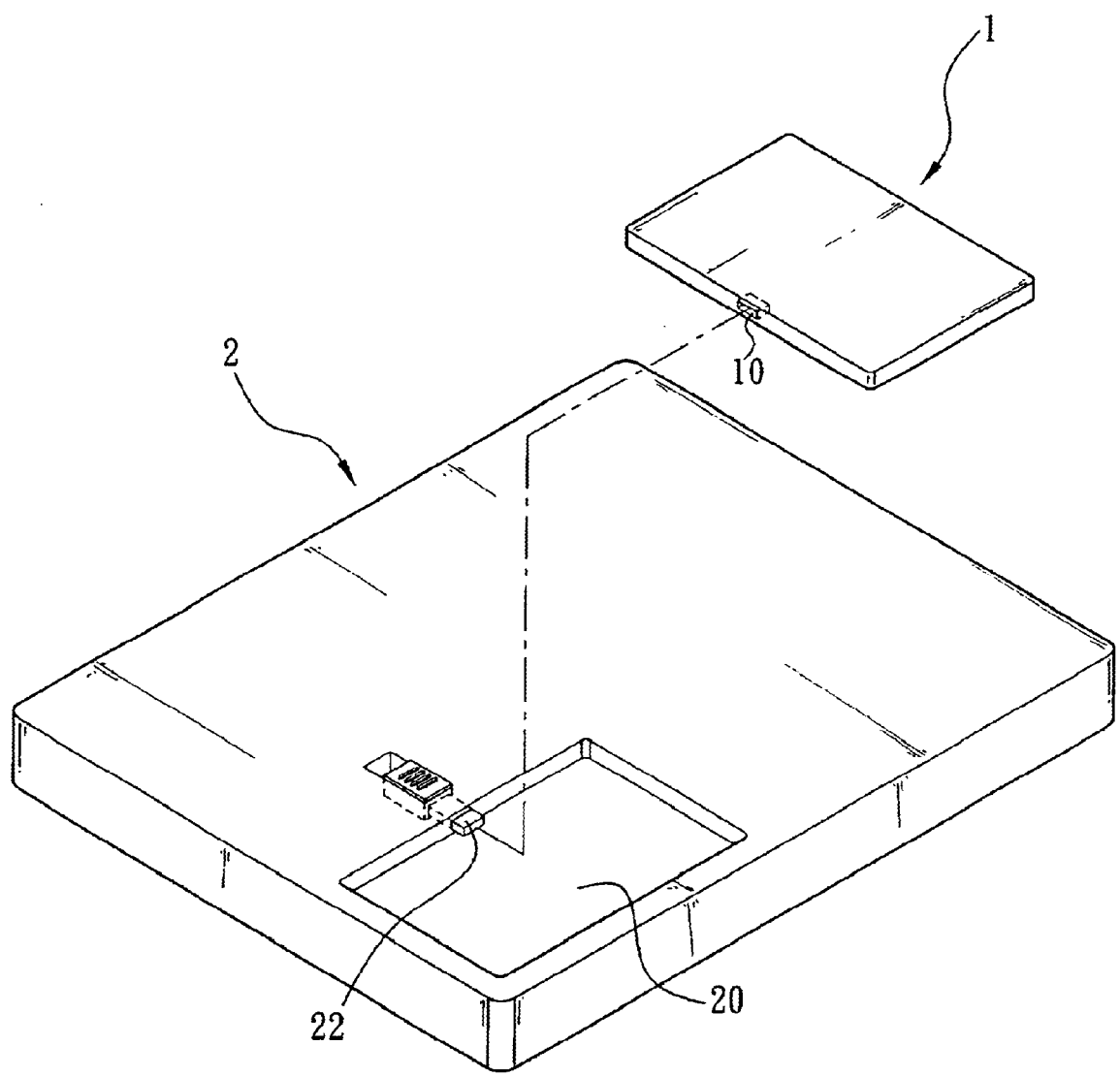
FIG. 1 is an exploded drawing of a conventional notebook computer and battery pack.
Figure 2:
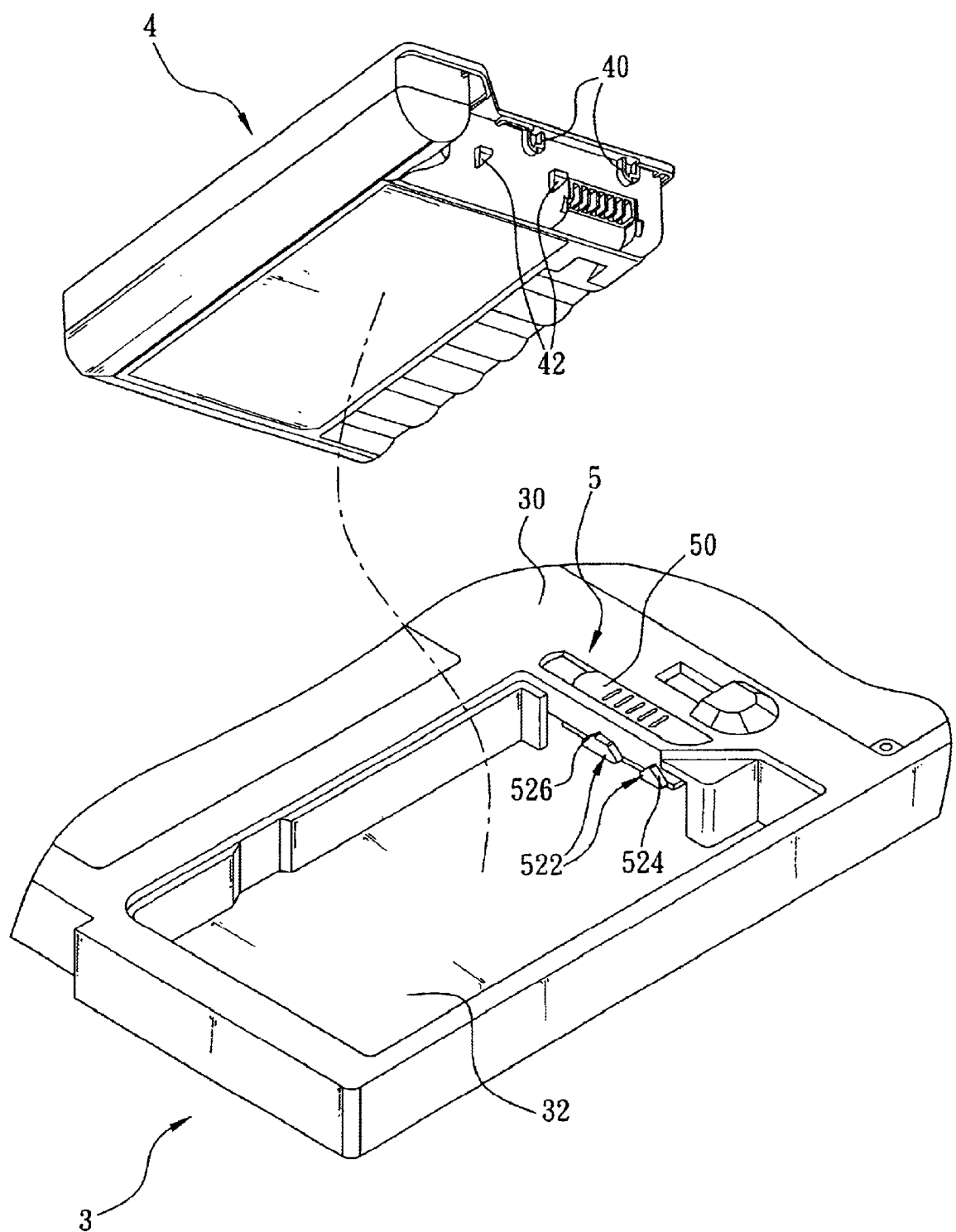
FIG. 2 is an exploded drawing of the electronic device and battery pack of the invention herein.

The invention herein is an electronic device battery pack removal and emplacement lock structure, referring to FIG. 2, comprised of a compartment 32 in the case 30 of an electronic device 3 that provides for the installation of a battery pack 4, a release structure 5 internally disposed in the said compartment 32, a minimum of one hook block 40 projecting from one side of the said battery back 4 and positioned proximal to its end, and a minimum of one hook block 40 projecting from a position proximal to its other end such that when the said battery pack 4 is installed into the said compartment 32, the angled surface of the said tapered polyhedron 42 pushes the said release structure 5 until the said battery pack 4 is completely ensconced within the said compartment 32, following which the said release structure 5 automatically returns to its original position and, furthermore, restrains the said tapered polyhedron 42, thereby securing the said battery pack 4 in the said compartment 32; when the said release structure 5 is again toggled, the said hook block 40 is pushed, enabling the extrication of the said battery pack 4 from the said compartment 32 and its stationing at the said release position.

Figure 3:
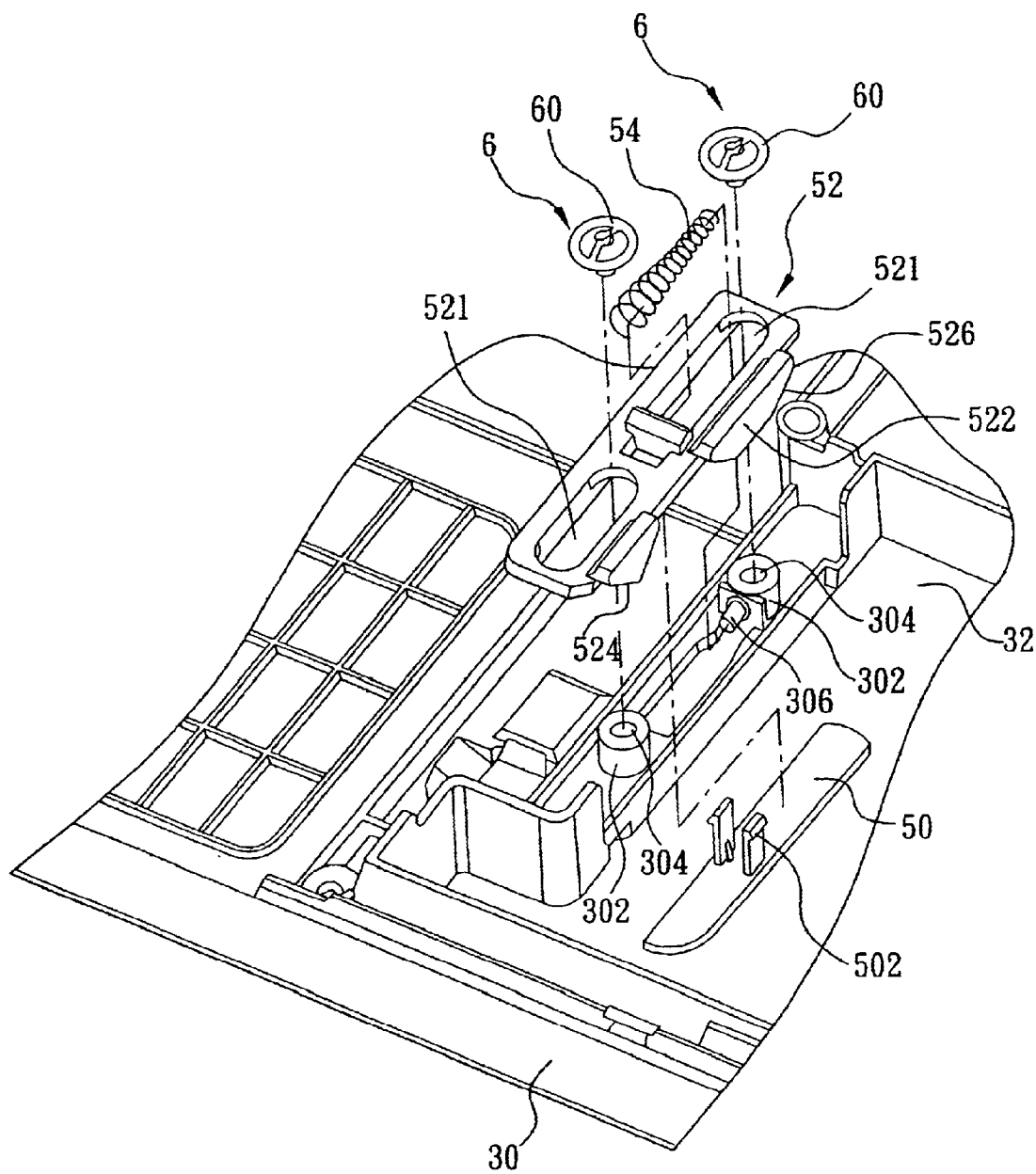
FIG. 3 is an exploded drawing of the release structure of the invention herein.
Figure 4:
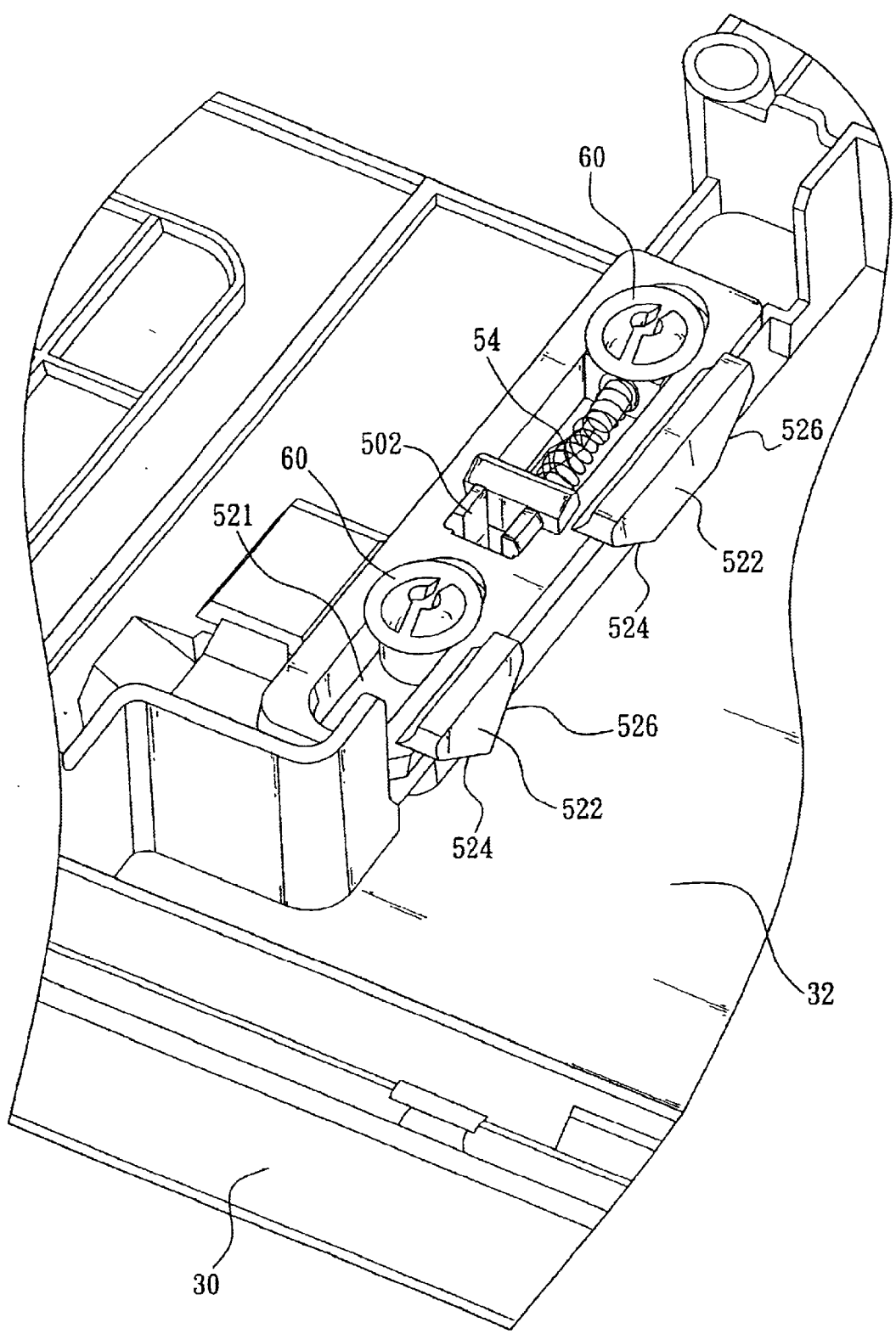
FIG. 4 is an isometric drawing of the release structure of the invention herein.
Figure 5:
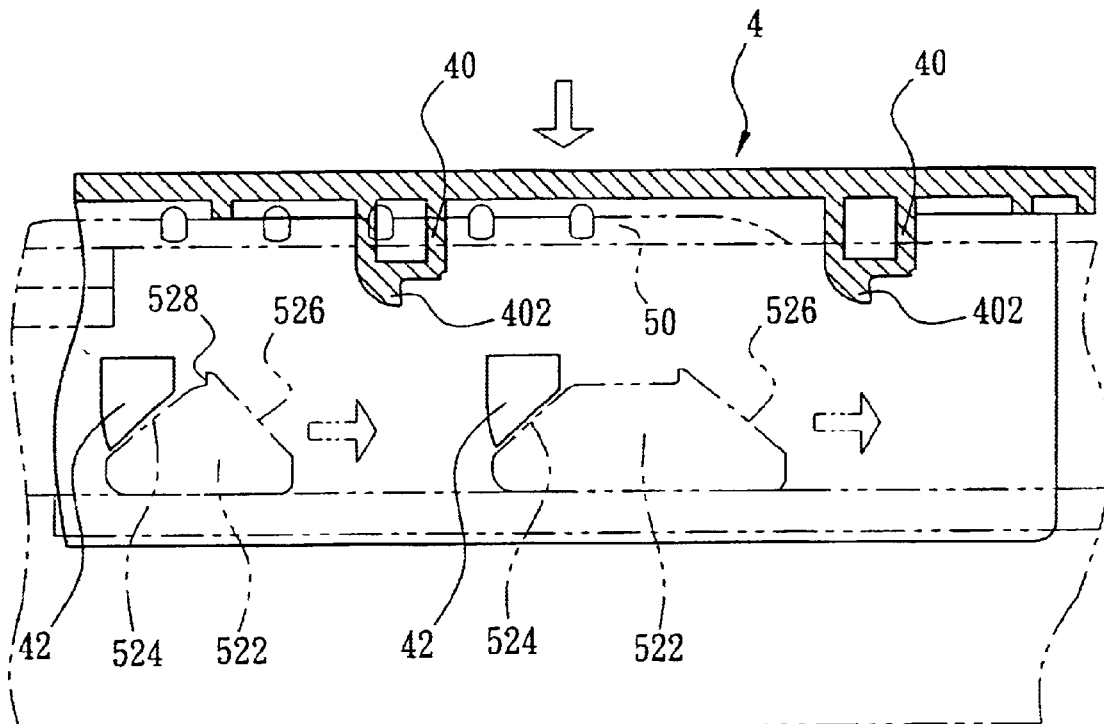
FIG. 5 is a cross-sectional drawing of the invention herein that illustrates the tapered polyhedron pushing the said block.
Figure 6:
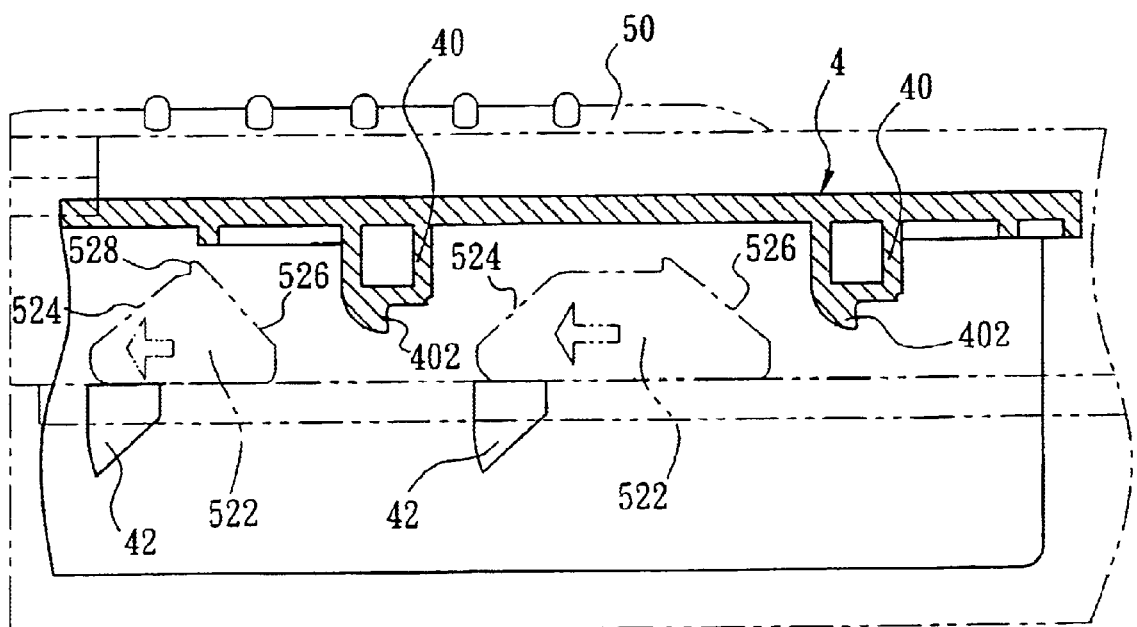
FIG. 6 is a cross-sectional drawing of the invention herein that illustrates the tapered polyhedron restrained by the said block.
Figure 7:
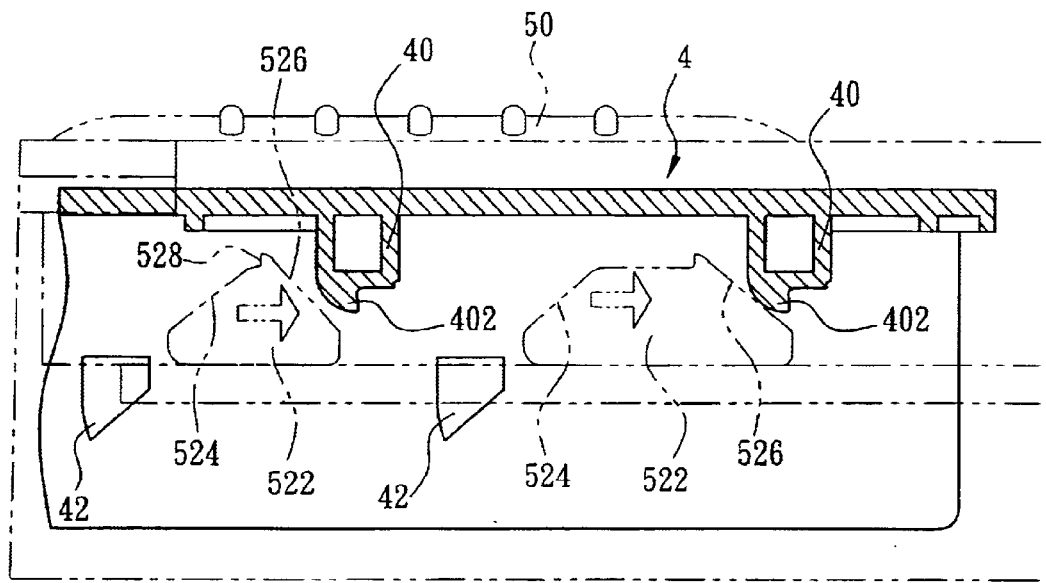
FIG. 7 is a cross-sectional drawing of the invention herein that illustrates the said block pushing the said hook block.
Figure 8:
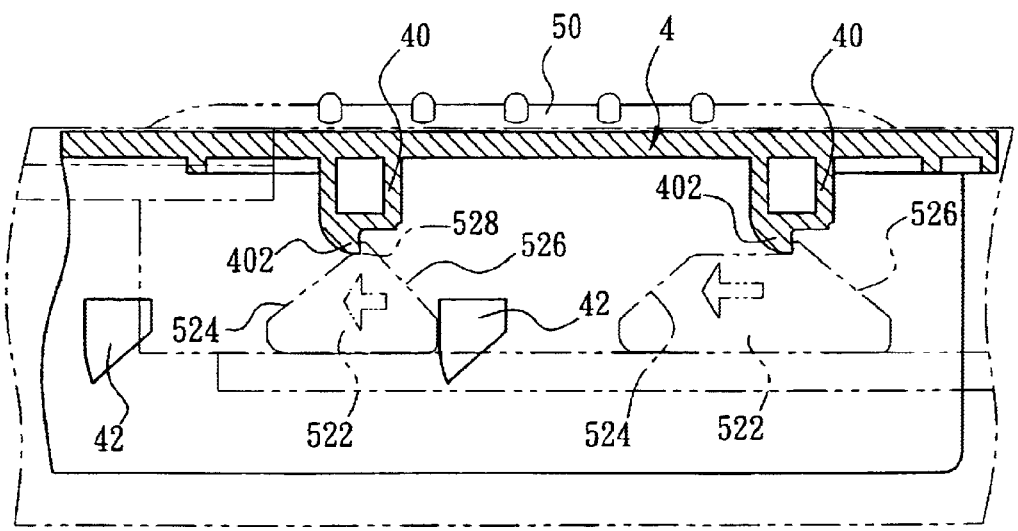
FIG. 8 is a cross-sectional drawing of the invention herein that illustrates the engagement of the said block and hook block.

In the most preferred embodiment of the invention herein, referring to FIG. 2, FIG. 3, and FIG. 4, the said release structure 5 consists of an actuating plate 50, a draw bar 52, and an elastic component 54, wherein the said actuating plate 50 is movably situated in the said case 30 adjacent to the said compartment 32 and, furthermore, protrudes from the surface of the said case 30 to enable the pushing of the said actuating plate 50.

The said draw bar 52 is situated in the said case 30 with one of its extremities linked to the said actuating plate 50 and the other extremity projecting into the said compartment 32 and thus exposed therein such that when the said actuating plate 50 is pushed, the said draw bar 52 moves along with the said actuating plate 50 and, furthermore, the extremity of the said draw bar 52 projecting into the said compartment 32 restrains the said tapered polyhedron 42 or pushes the said hook block 40, and since the said elastic component 54 is positioned in the said case 30 between the said actuating plate 50 and the said draw bar 52, when the said draw bar 52 is pushed by the said actuating plate 50, the said elastic component 54 is squeezed by the said draw bar 52 into a compressed state, causing the release of the said actuating plate 50, following which the rebound force of the said elastic component 54 impels the said draw bar 52 back to its original position.

In the said embodiment herein, a minimum of one block 522 is formed on the other extremity of the said draw bar 52 projecting into the said compartment 32, with the profile of the said block 522 matching that of the said hook block 40 and tapered polyhedron 42 such that when the said battery pack 4 is placed into the said compartment 32, the said block 522 pushes and restrains the said tapered polyhedron 42, thereby securing the said battery pack 4 within the said compartment 32, and said block 522 pushes the said hook block 40 such that when the said battery pack 4 is set free from the said compartment 32, the said block 522 becomes engaged onto the said hook block 40 and thereby restrains the said hook block 40, enabling the said battery pack 4 to be stationed at the said release position to facilitate the removal of the said battery pack 4.

In the said embodiment herein, referring to FIG. 3, FIG. 4, FIG. 5, and FIG. 6, a first beveled surface 524 and a second beveled surface 526 are formed along the two lateral extents of the said block 522 facing one surface of the said battery pack 4 placed in the said compartment 32, wherein the said first beveled surface 524 is the side of the said block 522 that contacts the said tapered polyhedron 42 such that when the said battery pack 4 is installed into the said compartment 32, the movement of the said battery pack 4 into the said compartment 32 causes the said tapered polyhedron 42 to push the said block 522 until the said tapered polyhedron 42 has completely passed the said block 522, following which the rebound force of the said elastic component 54 impels the said block 522 back to its original position and secures the said battery pack 4 within the said compartment 32.

Referring to FIG. 3, FIG. 4, FIG. 7, and FIG. 8, the said second beveled surface 526 is the side of the said block 522 that contacts the said hook block 40; a nib 528 is respectively formed on the surface of the said second beveled surface 526 that faces the said battery pack 4 placed into the said compartment 32 at the position it meets the said block 522, a curved surface is formed at one side where the said hook block 40 contacts the said block 522 and, furthermore, another nib 402 is formed on one surface facing the said block 522 such that when the said block 522 pushes the said hook block 40, the said hook block 40 travels along the said second beveled surface 526 and causes the said battery pack 4 to shift outward from the said compartment 32 until the said other nib 402 passes the said nib 528, at which time the said block 522 stops pushing the said hook block 40 and the said elastic component 54 causes the mutual engagement of the said nib 528 with the other nib 402, while the weight of the said battery pack 4 presses the said hook block 40 against the said block 522; as such, the said battery pack 4 does cannot be dislodged from the inside of the said compartment 32.

In the said embodiment herein, referring again to FIG. 2 and FIG. 3, a fastening section 502 facing the said draw bar 52 is disposed near the center of one surface of the said actuating plate 50 and another fastening section (not shown in the drawings) aligned with the said fastening section 502 is disposed on one surface of the said draw bar 52, with the said fastening section 502 and the said other fastening section interconnected to couple the said actuating plate 50 to the draw bar 52.

Furthermore, a minimum of one post 302 is situated on one surface of the said case 30 facing the said draw bar 52, with the said post 302 having a locating hole 304, and an elongated hole 521 facing the said post 302 is formed in the said draw bar 52, with the length of the said elongated hole 521 at minimum capable of accommodating the movement of the said draw bar 52 inside the said case 30 such that the said draw bar 52 can be pushed by the said tapered polyhedron 42 and push the said hook block 40.

Furthermore, a locating component 6 is inserted through the said elongated hole 521 and mounted on the said locating hole 304, with the end of the said locating component 6 away from the said locating hole 304 projecting slightly out from the said draw bar 52 and, furthermore, a flange section 60 is disposed on the said end and the outer diameter of the said flange section 60 is larger than the outer diameter of the said elongated hole 521 such that the movement range of the said draw bar 52 is checked by the said locating component 6 to preclude random course deviation.

In the said embodiment herein, one end of the said elastic component 54 is against an appropriate position of the said draw bar 52 and the other end is against the post 302 by which the said draw bar 52 is pushed in a particular direction such that when the said actuating plate 50 is pushed, the said elastic component 54 is squeezed by the said draw bar 52 into a compressed state and after the said actuating plate 50 is released, the rebound force of the said elastic component 54 impels the said draw bar 52 back to its original position.

In the said embodiment herein, a retaining section 306 is situated on the said post 302 at the contact position with the other end of the said elastic component 54, the said retaining section 306 fixing the other end of the said elastic component 54 such that the said elastic component 54 is not displaced during movement.

What is claimed is:

1. An electronic device battery pack removal and emplacement lock structure comprised of:
    a compartment recessed in the case of an electronic device that provides for the installation of a battery pack;
    a minimum of one hook block projecting from one side of the battery pack and positioned proximal to its end;
    a minimum of one tapered polyhedron projecting from one side of the battery pack and positioned proximal to its other end;
    a release structure that is actively disposed in the compartment such that when the battery pack is installed into the compartment, the slanted surface of the tapered polyhedron pushes the release structure until the battery pack is completely ensconced within the compartment, following which the release structure automatically returns to its original position and, furthermore, restrains the tapered polyhedron, thereby securing the battery pack in the compartment; when the release structure is later toggled, the hook block is pushed, enabling the extrication of the battery pack from the compartment and its stationing at the release position.

2. An electronic device battery pack removal and emplacement lock structure as claimed in claim 1 in which the release structure consists of:
    an actuating plate movably situated in the case adjacent to the compartment and, furthermore, protrudes from the surface of the case to enable the pushing of the actuating plate;
    a draw bar disposed in the case with one of its extremities linked to the actuating plate and the other extremity projecting into the compartment and thus exposed therein such that when the actuating plate is pushed, the draw bar moves along with the actuating plate to restrain the tapered polyhedron or push the hook block;
    an elastic component positioned between the case and the draw bar such that when the draw bar is pushed by the actuating plate, the elastic component is squeezed by the draw bar into a compressed state, causing the release of the actuating plate, following which the rebound force of the elastic component impels the draw bar back to its original position.

3. An electronic device battery pack removal and emplacement lock structure as claimed in claim 2 in which the draw bar has a minimum of one block formed on its other extremity projecting into the compartment, with the profile of the block matching that of the hook block and tapered polyhedron such that when the battery pack is placed into the compartment, the block restrains the tapered polyhedron, thereby securing the battery pack within the compartment or, when the block pushes the hook block such that the battery pack is nudged out from the compartment, the block becomes engaged on the hook block and thereby stations the battery pack at the release position.

4. An electronic device battery pack removal and emplacement lock structure as claimed in claim 3 in which the block has a first beveled surface formed on the side facing one surface of the battery pack placed in the compartment; the angled surface of the tapered polyhedron travels along the first beveled surface of the block until the end of the first beveled surface is reached and the tapered polyhedron has completely passed the block, whereupon the rebound force of the elastic component impels the block back to its original position;

the block has a second beveled surface formed on the other side facing one surface of the battery pack placed in the compartment and a nib is formed on the surface of the second beveled surface that faces the battery pack placed into the compartment at the position it meets the block;

a curved surface is formed at one side where the hook block contacts the block and, furthermore, another nib is formed on one surface facing the block such that when the actuating plate is toggled, the hook block moves along the second beveled surface and causes the battery pack to shift outward from the compartment until the other nib passes the nib, following which the rebound force of the elastic component causes the mutual engagement of the nib with the other nib.

5. An electronic device battery pack removal and emplacement lock structure as claimed in claim 2 in which the actuating plate has a fastening section facing the draw bar that is disposed near the center of one surface and the draw bar has another fastening section aligned with the fastening section disposed on one surface, with the fastening section and the other fastening section interconnected to couple the actuating plate to the draw bar.

6. An electronic device battery pack removal and emplacement lock structure as claimed in claim 2 in which the case has a minimum of one post situated on one surface facing the draw bar, with the post having a locating hole, and the draw bar has an elongated hole facing the post, with the length of the elongated hole at minimum capable of accommodating the movement of the draw bar inside the case;

the elongated hole provides for the insertion of a minimum of one locating component that is mounted on the locating hole, with the end of the locating component away from the locating hole projecting slightly out from the draw bar and, furthermore, a flange section is disposed on the end and the outer diameter of the flange section is larger than the outer diameter of the elongated hole such that the movement range of the draw bar is checked by the locating component.

7. An electronic device battery pack removal and emplacement lock structure as claimed in claim 6 in which the draw bar has one end of the elastic component situated against an appropriate position on it and the other end against the post by which the draw bar is pushed in a particular direction such that when the elastic component is brought into a compressed state by the pushing of the actuating plate, the rebound force of the elastic component impels the draw bar back to its original position after the actuating plate is released.

\* \* \* \* \*